United States Patent [19]
Kane

[11] 4,183,392
[45] Jan. 15, 1980

[54] STATIC TIRE INFLATOR

[75] Inventor: John P. Kane, Sterling Heights, Mich.

[73] Assignee: Allied Steel & Conveyors, Detroit, Mich.

[21] Appl. No.: 933,494

[22] Filed: Aug. 14, 1978

[51] Int. Cl.² ............................................. B60C 25/06
[52] U.S. Cl. ..................................................... 157/1.1
[58] Field of Search ................................. 157/1.1, 1.2

[56] References Cited

U.S. PATENT DOCUMENTS

| 2,779,397 | 1/1957 | Kohsiek | 157/1.1 |
|---|---|---|---|
| 2,900,015 | 8/1959 | Harrison | 157/1.1 |
| 2,910,117 | 10/1959 | Lamerson | 157/1.1 |
| 3,461,938 | 8/1969 | Mueller | 157/1.1 |
| 3,741,271 | 6/1973 | Ross et al. | 157/1.1 |
| 3,853,165 | 12/1974 | Collmann | 157/1.2 |
| 3,978,903 | 9/1976 | Mueller et al. | 157/1.2 |

*Primary Examiner*—James G. Smith
*Attorney, Agent, or Firm*—Beaman & Beaman

[57] ABSTRACT

The invention pertains to apparatus for inflating tubeless tires, particularly of large sizes, wherein the tire is quickly inflated, and a variety of wheel widths may be readily accommodated. A wheel and uninflated tire are located within the path of movement of an inflation head which includes an annular wheel rim seal ring which is brought into sealing engagement with the wheel rim. Thereafter, a tire sidewall engaging seal ring also mounted upon the inflation head compresses the tire sidewall under the influence of an expansible air bag motor to displace the tire bead from a sealing relationship with the wheel flange, and the sidewall engaging ring forms an annular compressed air receiving chamber with the wheel rim ring permitting compressed air to enter the tire throughout the displaced tire bead periphery. Upon air pressure equilibrium being achieved within the tire and chamber the sidewall engaging ring retracts under the influence of a second pressurized air bag motor mounted upon the inflation head to permit the tire bead to seat and seal against the wheel flange. Retraction of the inflation head from the wheel rim clears the inflated wheel-tire assembly. The apparatus of the invention is intended for automatic, high production tire inflation systems and is usually incorporated into conveyor apparatus.

6 Claims, 5 Drawing Figures

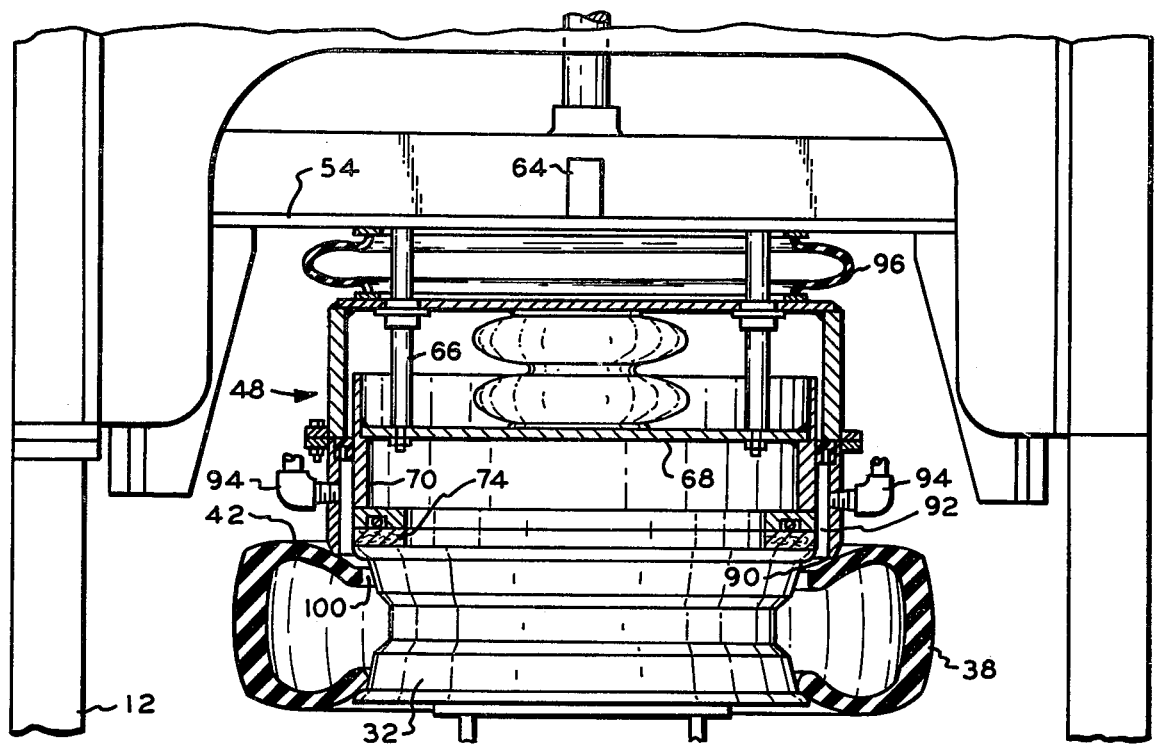
FIG_4_
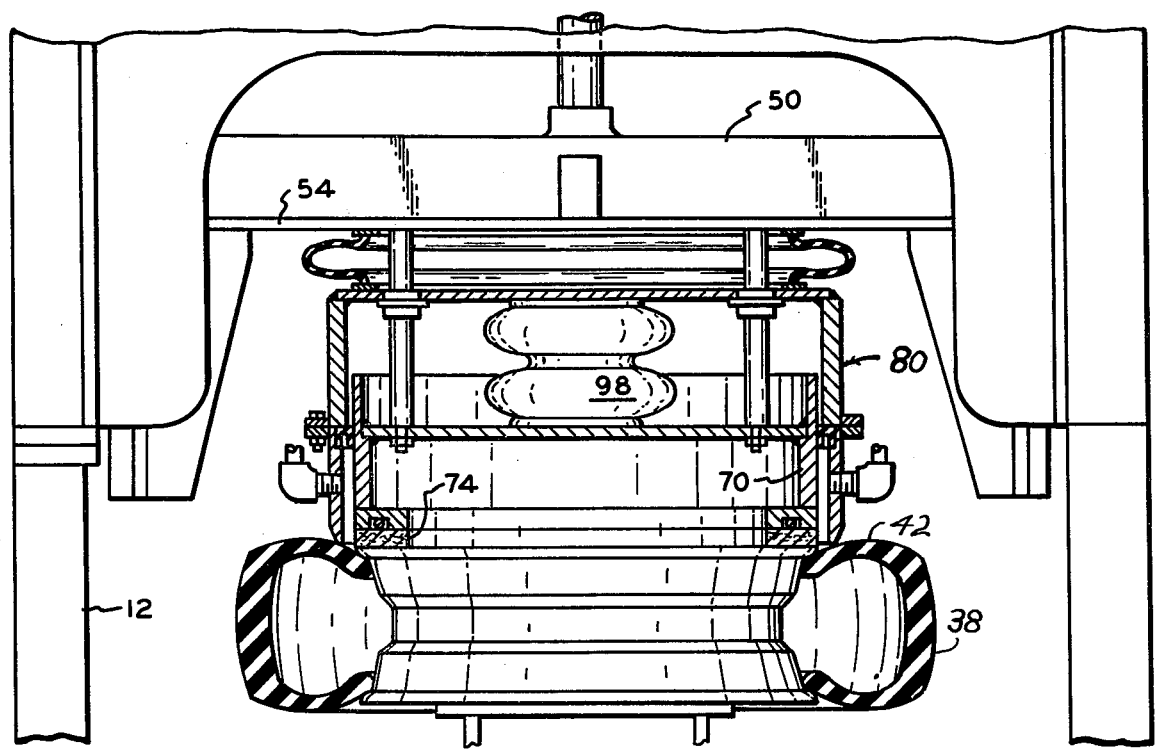
FIG_5_

STATIC TIRE INFLATOR

BACKGROUND OF THE INVENTION

The invention relates to static tire inflators for tubeless tires as used with high production wheel assembly and handling systems.

It is presently the practice to rapidly inflate tubeless tires on a production basis by displacing a tire bead from the wheel flange and injecting air into the tire around the bead, and examples of such tire inflation devices are shown in U.S. Pat. Nos. 2,779,397; 2,900,015; 2,910,017; 3,461,938 and 3,978,903. Such apparatus, as shown in 3,978,903, may include an annular air chamber as defined by seal rings engaging the wheel rim and tire sidewall which communicates with the interior of the tire at the tire bead, and pressurized air introduced into the chamber rapidly inflates the tire.

Previously known tubeless tire inflating apparatus of the aforementioned type, while able to rapidly inflate a tire, has, in the past, not overcome all of the problems encountered in the high pressure inflation of heavy duty truck tires wherein 60 to 90 psi inflation pressures are required. For instance, the prior inflators require large supplies of compressed air, are noisy and cannot accurately control the inflation air pressure. Additionally, known tubeless tire inflators of the aforementioned type cannot readily adapt themselves to variations in wheel sizes and widths, and it is often necessary to require time consuming shut downs in order to modify the apparatus to accommodate various wheel and tire sizes.

SUMMARY OF THE INVENTION

It is an object of the invention to provide a static tire inflator for tubeless tires wherein heavy duty tires may be quietly inflated to high pressures rapidly and at a high production rate and requires a minimum of wheel handling.

A further object of the invention is to provide a static tire inflator for tubeless tires wherein the inflation apparatus may readily accommodate various widths of wheels, and wherein a single inflation head may be employed in the inflation of tires mounted on wheels of various widths without modification.

An additional object of the invention is to provide a static tire inflator for tubeless tires which does not require displacement of the wheel and tire in the axial direction thereof during inflation, and wherein wheel and tire handling is minimized during inflation.

Yet another object of the invention is to provide a tubeless tire inflator capable of producing high inflation pressures accurately and employing positive power operated means for compressing the tire sidewall to displace the tire bead from the wheel flange, and for producing engagement of the tire bead and wheel flange after inflation has been completed.

In the practice of the invention a frame, usually vertically oriented, includes a lower region disposed adjacent an indexing conveyor system transporting assembled, or partially assembled, wheels and uninflated tires. The conveyor system terminates wheel and tire movement upon the assembly being oriented below an inflation head mounted upon the frame upper region.

The inflation head axis is coaxial with the wheel and tire assembly axis during inflation, and an expansible motor linearly translates the inflation head toward the wheel aseembly upon frame mounted guides. The inflation head includes an annular wheel rim seal ring which engages the upper wheel rim upon extension of the inflation head motor, and the rim seal ring forms an annular chamber with a cylindrical tire sidewall engaging seal ring also mounted upon the inflation head and in radially spaced relationship to a portion of the rim seal ring wall. The sidewall engaging seal ring is mounted upon the inflation head for translation thereon parallel to the inflation head axis between sidewall compressing and release positions, and expansible motor means in the form of a pair of flexible wall air bags translates the sidewall engaging seal ring relative to the rim seal ring. One air bag moves the sidewall ring in a direction to compress the tire sidewall establishing communication between the tire interior and the annular chamber wherein compressed air supplied to the chamber readily flows into the tire, and upon the air pressure within the tire and chamber equalizing the other motor means air bag translates the sidewall seal ring in the opposite direction to permit the tire bead to sealingly engage the wheel flange, and continued movement of the seal ring in the release direction breaks the seal with the tire sidewall of the inflated tire and permits the air pressure within the chamber to return to atmospheric conditions.

In the practice of the invention the wheel and tire assembly is static, except for deflection of the tire sidewall, while the relative motion takes place solely at the inflation head structure. With the apparatus of the invention it is possible to accurately inflate heavy duty truck tires to 60 to 80 psi, and greater pressures if desired, and the positioning and control of the inflation head seal rings may be automatically controlled wherein various widths of wheels are automatically accommodated, and the apparatus lends itself to ready adaptation to various wheel diameters.

BRIEF DESCRIPTION OF THE DRAWINGS

The aforementioned objects and advantages of the invention will be appreciated from the following description and accompanying drawings wherein:

FIG. 4 is an elevational, sectional, detail view of the inflation head illustrating the seal rings in the relationship which permits inflation of the tire, and FIG. 5 is an elevational, detail, sectional view of the inflation head illustrating the relationship of the seal rings upon the sidewall seal ring partially retracting permitting engagement of the tire bead with the wheel flange, and prior to full retraction of the sidewall seal ring.

DESCRIPTION OF THE PREFERRED EMBODIMENT

Figure 1:
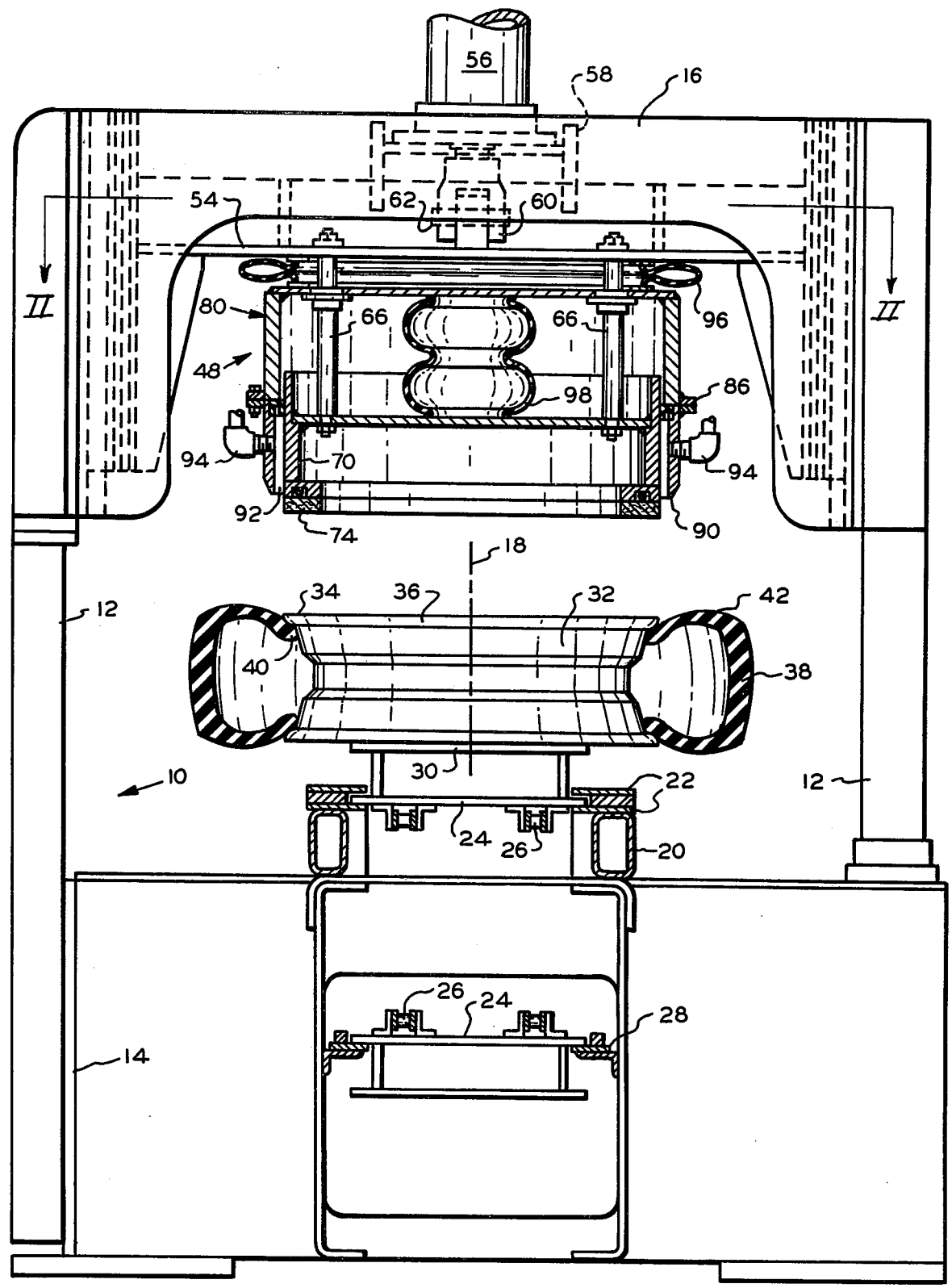
FIG. 1 is an elevational view of a static tire inflator apparatus in accord with the invention, partially in section, illustrating the inflation head in a retracted position.

With reference to FIG. 1, the apparatus constituting the static tire inflator of the invention includes a frame 10 which includes vertically extending columns 12 mounted upon a base 14. At its upper region, columns 12 are interconnected by spaced, parallel bridge plates 16, and the apparatus includes a central longitudinal vertical axis as represented at 18.

Indexing conveyor structure is incorporated into the base 14, and in the illustrated embodiment, includes a conveyor table 20 mounted upon the frame base and defining guide tracks between parallel plates 22 for receiving the wheel supporting pallets 24 mounted upon the conveyor chains 26. Thus, it will be appreciated that the wheel pallets 24 centrally move through the frame axis 18 in a direction perpendicular to the plane of the drawings, and return guide plates 28 support the pallets at the return portion of the conveyor.

The pallets 24 includes a wheel supporting plate 30 upon which conventional wheel orientation means, such as guide pins or the like, not shown, are located whereby a wheel 32 may be accurately located thereon. The wheel 32 includes an upper rim 34 defined adjacent the upper wheel flange 36, and, when received by the inflation apparatus, a tubeless tire 38 has been assembled to the wheel either in a full or partial manner, and if the upper bead 40 of the tire has been pushed over the wheel flange 36 the tire beads may be engaging the wheel flanges due to the natural resiliency of the tire. The tire includes an upper sidewall 42 capable of being compressed during the inflation process, as will be described.

Figure 2:
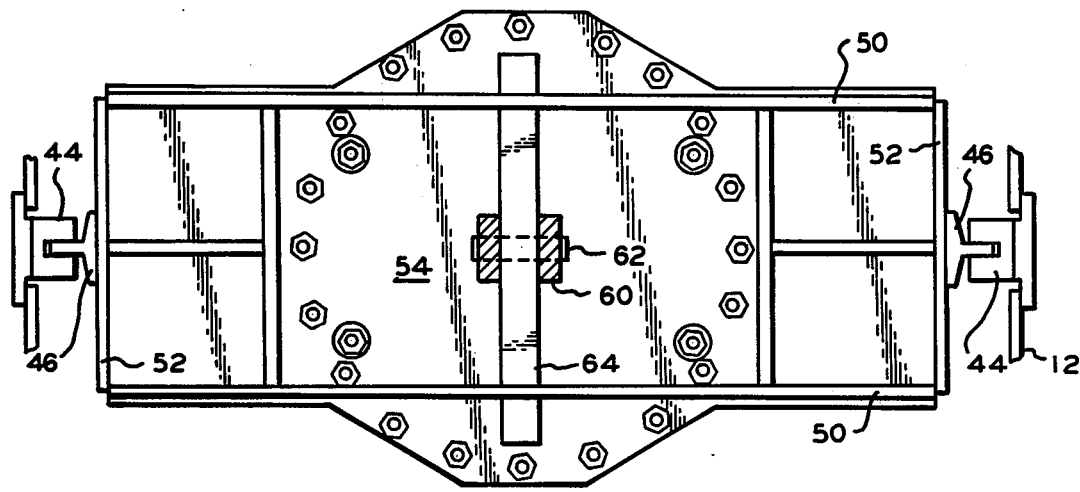
FIG. 2 is a plan sectional view of the apparatus of the invention taken along Section II—II of FIG. 1.

The upper region of the frame 10 includes on its columns 12 vertically extending tracks 44, FIG. 2, which cooperate with guides 46 supporting an inflation head 48 defined by rectangularly oriented sidewall plates 50, end plates 52, and a bottom plate 54. An expansible motor 56 of the air-hydraulic cylinder type is mounted upon the frame bridge plates 16 upon brackets 58, FIG. 1, and the motor includes a piston upon which clevis 60 is mounted. Clevis 60 is pivotally affixed by pin 62 to block 64 which is connected to the upper side of the inflation head bottom plate 54, as will be apparent from FIGS. 1 and 2. In this manner the inflation head 48 may be vertically positioned on the columns 12 in a direction parallel to the axis 18, extension of the piston moving the inflation head toward the wheel 32, while piston retraction clears the inflation head from the wheel and tire assembly.

Four vertically extending guide rods 66 are fixed to the head plate 54 extending toward the frame base 14, and a plate 68 is bolted to the lower end of the guide rods as will be appreciated from FIG. 1. The plate 68 is of a circular configuration and is fixed to the cylindrical wheel rim seal ring 70, and serves as the means for attaching the ring to the plate 54. The ring 70 is cylindrical on its exterior surface, and an annular seal anchor ring 72 is welded upon the lower edge which serves as a support for the packing ring 74 which is of a stiff resilient material as to form a sealed engagement with the wheel rim 34 upon lowering of the inflation head. The packing ring 74 is open at its central region.

A bushing 72 is mounted upon each of the four guide rods 66 for vertical sliding displacement thereon, and the bushings 76 support the upper sidewall ring plate 78. At its periphery, the plate 78 supports the circular tire sidewall engaging seal ring 80, which is formed in two parts, an upper part 82 of greater radial thickness than the lower portion 84, the two parts being assembled by flanges and bolts generally indicated at 86, FIG. 1.

The sidewall seal ring 80 includes a resilient U-shaped lip seal 88 which forms a sealed relationship with the rim seal ring 70, and at its lower region the ring 80 includes a tire engaging nose surface 90. As will be appreciated from the drawings, the inner diameter of the ring 80 is significantly greater than the outer diameter of the ring 70 whereby an annular air chamber 92 is defined between the rings.

The chamber 92 is supplied with compressed air through a plurality of fittings 94, usually four, threaded into the ring portion 84, and by means of the fittings a large volume of compressed air may be rapidly, quietly and evenly introduced into the chamber 92.

Vertical displacement of the sidewall seal ring 80 upon the inflation head structure is produced by expansible motor means, preferably of the air bag type wherein a pair of air bags raise and lower the ring upon the guide rods 66 under control of appropriate valve structure, not shown. The upper air bag 96 circumscribes the guide rods and is sealingly attached to the plate 54 and plate 78 by bolts. A compressed air source, not shown, communicates with the internal chamber of the air bag 96, and it will be appreciated that inflation of the air bag will force the plate 78, and ring 80 toward the wheel and tire assembly. The air bag 96 may be of the type manufactured by Firestone Tire & Rubber Company, Model No. 134-1.5.

Air bag structure is also employed to raise the ring 80 to the release position, and the air bag 98 is interposed between the plate 68 of ring 70, and the plate 78. The air bag 98 may be a Firestone No. 26 air bag, and compressed air supply means, not shown, communicate with both bags to produce selective inflation and deflation thereof.

Figure 3:
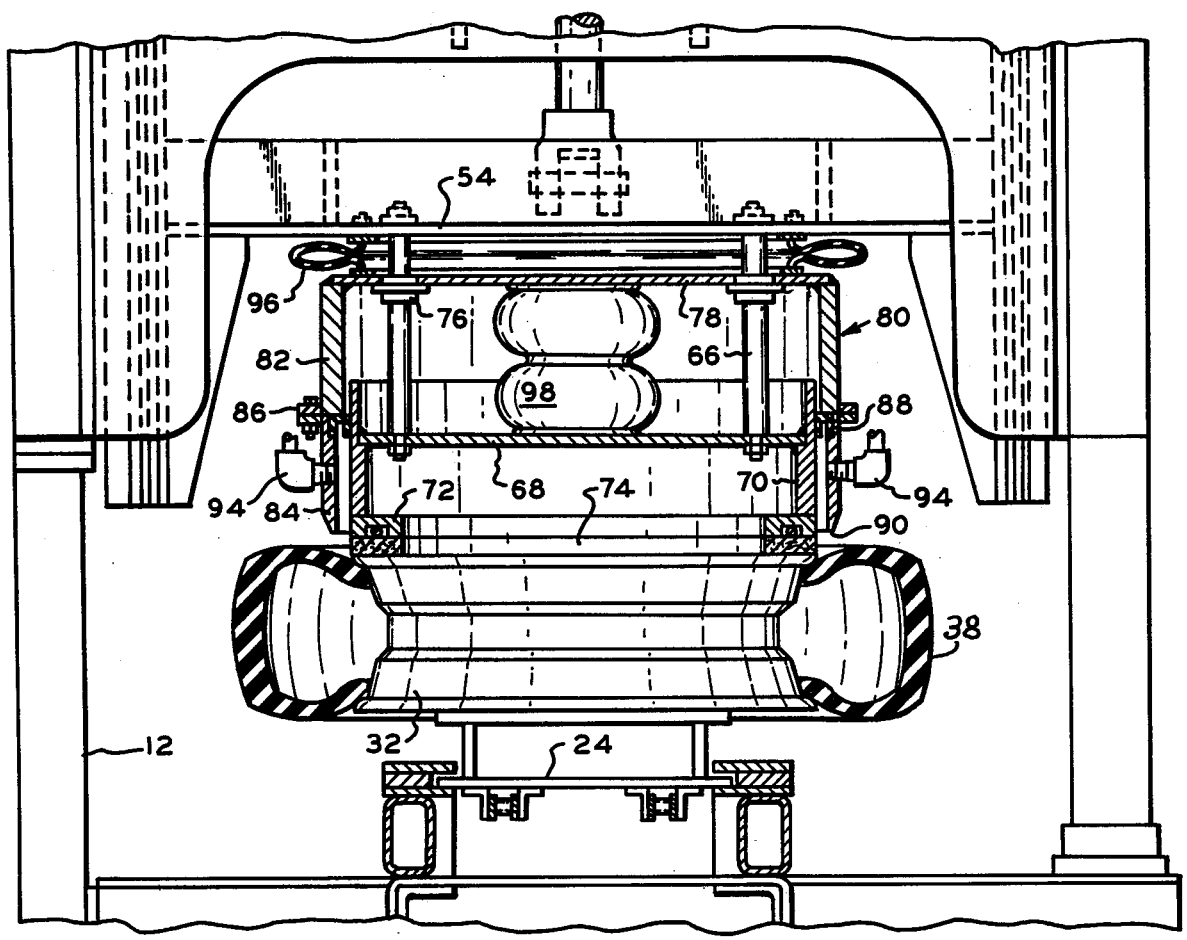
FIG. 3 is a detail, elevational, sectional view of the inflation head illustrating the wheel rim seal ring engaging the wheel rim, with the sidewall seal ring in retracted position.

Operation of the apparatus in accord with the invention is as follows:

After the wheel 32 and tire 38 have been fully, or partially assembled, the same are placed upon a pallet 24, if they are not already located thereon, and the indexing pallet conveyor will position the wheel and tire coaxial with the frame axis 18, which coincides with the axis of the inflation head 48. The motor 56 is thereupon energized, usually by automatic control means, not shown, to lower the inflation head 48 toward the wheel 32. This lowering continues until the packing ring 74 of wheel rim ring 70 engages the wheel rim 34. At this time a hydraulic assist pressure is applied to motor 56 to additionally compress ring 74 to insure an air tight engagement of the ring 70 with the wheel rim. During this initial movement, the ring 80 has been in the retracted position shown in FIG. 1 and FIG. 3 wherein the nose 90 of ring 80 is located above the packing 74.

Upon completion of the sealing of the ring 70 to the wheel 32 the air bag 96 is inflated to move the sidewall engaging ring 80 downwardly engaging the nose surface 90 with the tire sidewall 42 and forcing the tire bead 40 over the wheel rim 34, if it has not already been forced thereover, which is usually the case. The downward motion of the ring 80 continues until the tire sidewall is compressed as shown in FIG. 4, which maintains the bead 40 spaced from the wheel rim 34 to define a gap 100 whereby communication is established between the air chamber 92 and the tire interior through the gap. During inflation of the air bag 96 the air bag 98 control valve, not shown, is in the exhaust position wherein the air bag 98 offers no resistance to the movement of the ring.

At this time, it will be appreciated that an effective air seal has been established between the wheel rim 34 and the tire sidewall 42, and compressed air is injected into the chamber 92 through the fittings 94. Air at the predetermined inflation pressure continues to flow into the chamber 92 and the interior of the tire until the air pressure within the tire and chamber equalizes and stabilizes. Upon automatic air pressure control means, not shown, sensing this condition the valve controlling inflation of air bag 96 is now set at the exhaust condition, and air bag 98 is inflated. Inflation of air bag 98 raises the ring 80 permitting the tire sidewall to raise, and this action causes the tire bead 40 to engage and seal against the upper rim of the wheel sealing the air within the tire. The relationship of the components at this time are as shown in FIG. 5. The flow of inflation air into chamber 92 is now terminated, ring 80 continues to rise on guide rods 66 under the influence of air bag 98 to the position shown in FIG. 3 and the motor 56 is now energized to raise the inflation head to the "ready" position of FIG. 1 wherein the apparatus is now in condition for the next cycle of operation.

The aforedescribed apparatus eliminates the necessity of raising and lowering the wheel assembly and as only the inflation head 48 is moved during operation the apparatus will automatically accommodate various widths of wheels, and the radial dimension of the packing ring 74 is great enough to accommodate a relatively wide variation in wheel diameter. The apparatus permits the accurate inflation of heavy duty tires at high inflation pressures with a minimum of air and noise, and as the cycle of operation may be quickly accomplished the apparatus may be utilized in high production wheel assembly systems. The apparatus permits higher inflation pressures with a lower supply of air than known inflators, and is highly efficient as almost all of the air introduced into the inflation head enters the tire, with no "blow by".

It is appreciated that various modifications to the inventive concept may be apparent to those skilled in the art without departing from the spirit and scope of the invention.

I claim:

1. Apparatus for inflating tubeless tires having sidewalls and beads upon rimmed wheels having an axis comprising, in combination, an elongated frame having an axis, a wheel supporting region and an inflation head supporting region, wheel supporting means defined on said frame at said wheel supporting region supporting a wheel coaxial with said frame axis wherein the wheel rims are perpendicular to said frame axis, an inflation head movably mounted upon said head supporting region having an axis coaxial with said frame axis, and movable in a direction parallel to said frame axis toward and away from said wheel supporting means between retracted and extended positions, first translation means mounted on said frame selectively positioning said head between said retracted and extended positions, said head including an annular rim seal ring and an annular tire sidewall seal ring each concentric with each other and said frame axis, said rim seal ring being fixed with respect to said head and within and radially spaced from said tire sidewall seal ring defining an air chamber therewith and including an annular seal edge sealingly engaging a wheel rim at said inflation head extended position, means mounting said tire sidewall seal ring upon said inflation head for relative movement thereto parallel to said axis between sidewall compressing and sidewall release positions, second translation means mounted upon said head selectively translating said tire sidewall seal ring between said sidewall compressing and release positions, an annular tire sidewall seal edge defined on said sidewall seal ring adapted to sealingly engage the tire sidewall at said sidewall compressing position, said tire sidewall seal ring adapted to displace the tire bead from the wheel rim at said sidewall compressing position to establish communication between said air chamber and the interior of said tire, and a source of pressurized air communicating with said air chamber whereby compressed air may be selectively supplied to the interior of the tire during compressing of the tire sidewall and release of the tire sidewall permits engagement of the tire bead and wheel rim to retain the tire in inflated condition.

2. Apparatus for inflating tubeless tires as in claim 1, guide means defined on said frame inflation head supporting region parallel to said frame axis, said inflation head being slidably guided within said guide means, said first translation means comprising an expansible motor selectively positioning said head within said guide means.

3. In an apparatus for inflating tubeless tires as in claim 1, linear guide means defined on said inflation head substantially parallel to said frame axis, said tire sidewall seal ring being mounted upon said linear guide means for translation thereon between said sidewall compressing and release positions.

4. In an apparatus for inflating tubeless tires as in claim 3 wherein said second translation means comprises bi-directional motor means selectively translating said tire sidewall seal ring between said compressing and release positions.

5. In an apparatus for inflating tubeless tires as in claim 4, said second translation means comprising a first motor interposed between said head and tire sidewall seal ring for translating said sidewall seal ring toward the tire, and a second motor interposed between said rim seal ring and said sidewall seal ring for translating said sidewall seal ring toward said release position.

6. In an apparatus for inflating tubeless tires as in claim 5 wherein said first and second motors comprises flexible walled envelopes.

* * * * *